(12) United States Patent
Kim et al.

(10) Patent No.: US 6,633,513 B1
(45) Date of Patent: Oct. 14, 2003

(54) MAGNETO-OPTICAL HEAD FOR MAGNETO-OPTICAL READING AND WRITING SYSTEM

(75) Inventors: Woon-bae Kim, Suwon (KR); Byoung-chan Lee, Seoul (KR); Hyung-gae Shin, Seongnam (KR); Cheol-sung Yeon, Suwon (KR); Sang-hun Lee, Seoul (KR); Jong-woo Shin, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 190 days.

(21) Appl. No.: 09/599,500

(22) Filed: Jun. 23, 2000

(30) Foreign Application Priority Data

Jun. 24, 1999 (KR) .......................... 1999-23946

(51) Int. Cl.[7] .............................................. G11B 11/00
(52) U.S. Cl. .................................. 369/13.13; 369/13.33
(58) Field of Search ........................ 369/13.13, 13.33, 369/13.17, 13.32, 44.14, 112.01

(56) References Cited

U.S. PATENT DOCUMENTS

| | | | | | |
|---|---|---|---|---|---|
| 5,293,360 | A | * | 3/1994 | Hasegawa et al. | 369/13.13 |
| 5,986,995 | A | * | 11/1999 | He et al. | 369/13.13 |
| 6,055,222 | A | * | 4/2000 | Knight | 369/13.13 |
| 6,069,853 | A | * | 5/2000 | Novotny et al. | 369/13.13 |
| 6,094,803 | A | * | 8/2000 | Carlson et al. | 29/602.1 |
| 6,130,864 | A | * | 10/2000 | Burroughs | 369/13.13 |
| 6,307,832 | B1 | * | 10/2001 | Novotny et al. | 369/13.13 |
| 6,320,841 | B1 | * | 11/2001 | Watanabe et al. | 369/13.13 |
| 6,407,884 | B1 | * | 6/2002 | Osborne et al. | 360/114 |

* cited by examiner

*Primary Examiner*—Tan Dinh
(74) *Attorney, Agent, or Firm*—Staas & Halsey LLP

(57) ABSTRACT

A magneto-optical head for magneto-optical writing and reading systems having an improved construction for a field modulating coil and a miniature objective lens, and a method of manufacturing the magneto-optical head. The magneto-optical head is mounted at the end of a slide-arm movable over a magneto-optical recording medium by hydrodynamics and includes: a lens mounted at the end of the slide-arm, for focusing incident light to form a light spot on the magneto-optical recording medium; a coil member including at least two stacked coil layers, and an insulating layer interposed between adjacent coil layers for electrically insulating the adjacent coil layers from one another, the stacked coil layers being planar coils with a spiral structure and having electrical contacts for electrical connection therebetween; and a connection member interposed between the lens and the coil member, for connecting the coil member to one side of the lens, facing the magneto-optical recording medium, and for electrically connecting the coil layers to an external power supply. The coil member is manufactured using a semiconductor fabrication process.

25 Claims, 12 Drawing Sheets

MAGNETO-OPTICAL HEAD FOR MAGNETO-OPTICAL READING AND WRITING SYSTEM

CROSS-REFERENCE TO RELATED APPLICATIONS

This application claims the benefit of Korean Application No. 99-23946, filed Jun. 24, 1999 in the Korean Industrial Property Office, the disclosure of which is incorporated herein by reference.

BACKGROUND OF THE INVENTION

1. Field of the Invention

The present invention relates to a magneto-optical head for magneto-optical reading and writing systems, with improved structure associated with a field modulation coil and installation of a miniature objective lens, and a method of manufacturing the same.

2. Description of the Related Art

Magneto-optical reading and writing systems write information onto magneto-optical recording media by magnetic field modulation, and read written information from the media in an optical manner.

Referring to FIG. 1, a common magneto-optical reading and writing system is shown. The magneto-optical reading and writing system includes a swing arm 21 mounted to enable it to pivot relative to a base 10, an actuator 23 for providing a rotary driving force to the swing arm 21, an air-bearing slider 25, attached at one end of the swing arm 21, which flies over a magneto-optical recording medium 1 by hydrodynamics to scan tracks thereof, and a magneto-optical head 30 mounted at the slider 25 to read information optically from the magneto-optical recording medium 1. The magneto-optical head 30 includes an objective lens 31 for focusing a light spot onto the magneto-optical recording medium 1, and coils (not shown) for magnetic field modulation.

Referring to FIGS. 2 and 3, the conventional magneto-optical head 30 of a magneto-optical reading and writing system includes: the objective lens 31, which is installed on the slider 25, for focusing incident laser light onto the magneto-optical recording medium 1; a pair of magnetic pole pieces 33 and 35 mounted parallel to and on respective sides of the slider 25, and also mounted between the objective lens 31 and the surface of the magneto-optical recording medium 1; and first and second coils 37 and 39 are wound around the magnetic pole pieces 33 and 35, respectively. The magnetic pole pieces 33 and 35 are separated from one another, allowing laser light focused by the objective lens 31 to pass through the gap therebetween. The first and second coils 37 and 39 establish horizontal magnetic fields, the orientation of which varies according to the direction of current flowing through the coils 37 and 39, which enables the magneto-optical head 30 to write information onto the magneto-optical recording medium 1.

As previously described, the conventional magneto-optical head 30 has the construction in which the first and second coils 37 and 39 are wound around the magnetic pole pieces 33 and 35 mounted below the objective lens 31 in a horizontal direction. Due to the structure, there are limitations in miniaturizing the magneto-optical head 30, which limits the recording density and performance of near-field recording. In addition, winding the first and second coils 37 and 39 around the magnetic pole pieces 33 and 35, respectively, is ineffective in terms of assembling characteristics, costs and yields, thereby making mass production thereof difficult.

SUMMARY OF THE INVENTION

To solve the above problems, it is an object of the present invention to provide a magneto-optical head for magneto-optical reading and writing systems and a method of manufacturing the same, in which a thin film type microcoil for field modulation is formed in a semiconductor fabrication process, so that the magneto-optical head can be miniaturized with improved performance of near-field recording.

It is a further object of the present invention to provide a magneto-optical head for magneto-optical reading and writing systems and a method of manufacturing the same which simplifies the assembling of miniature coils to lower costs and increases yields to enable mass production of the magneto-optical reading and writing systems.

Additional objects and advantages of the invention will be set forth in part in the description which follows and, in part, will be obvious from the description, or may be learned by practice of the invention.

According to an aspect of the present invention, there is provided a magneto-optical head for a magneto-optical writing and reading system capable of writing information on a magneto-optical recording medium by field modulation and optically reading information from the magneto-optical recording medium, the magneto-optical head being mounted at the end of a slide-arm movable over the magneto-optical recording medium by hydrodynamics, the magneto-optical head comprising: a lens mounted at the end of the slide-arm, for focusing incident light to form a light spot on the magneto-optical recording medium; a coil member including at least two stacked coil layers, and an insulating layer interposed between the two coil layers for electrically insulating the two coil layers from one another, the two stacked coil layers being planar coils with a spiral structure and having electrical contacts for electrical connection therebetween; and a connection member interposed between the lens and the coil member, for connecting the coil member to one side of the lens, facing the magneto-optical recording medium, and for electrically connecting the coil layers to an external power supply.

Preferably, the connection member is solder bumps formed projecting from the uppermost coil layer of the coil member, with a conductive material for electrical connection to the external power supply, the solder bumps adhering to the lens by thermal melting. Preferably, the solder bumps are formed of at least one metal alloy selected from the group consisting of a tin-lead (Sn—Pb) alloy, a silver-tin-lead (Ag—Sn—Pb) alloy and a gold-tin (Au—Sn) alloy.

According to another aspect of the present invention, there is provided a method of manufacturing a magneto-optical head for a magneto-optical writing and reading system capable of writing information on a magneto-optical recording medium by magnetic field modulation and optically reading information from the magneto-optical recording medium, the magneto-optical head being mounted at the end of a slide-arm movable over the magneto-optical recording medium by hydrodynamics, the method comprising: forming a sacrificial layer over a substrate; forming a coil member over the sacrificial layer, the coil member including at least two coil layers and at least one insulating layer; patterning the coil member and the sacrificial layer to form a through hole; forming a plating mold pattern over the uppermost coil layer of the coil member, and plating solder into the plating mold pattern to form solder bumps; preparing a lens having an emitting portion projecting a predetermined length toward the magneto-optical recording medium, the lens for focusing incident light to form a light spot on the magneto-optical recording layer, and coating a metal thin film having a predetermined pattern on the bottom surface of the lens, except on the emitting portion, to form a conductive reflective layer; inserting the emitting portion into the through hole to place the lens on the solder bumps, and heating the assembly to melt the solder bumps and adhere the lens to the coil member; and removing the sacrificial layer to separate the combined lens and coil member from the substrate.

Preferably, forming the coil member comprises: forming a seed layer pattern for plating over the sacrificial layer; depositing a mold over the seed layer pattern to a predetermined thickness, and patterning the mold layer to form a plating mold pattern; plating a metal into the plating mold pattern to form a coil layer having a predetermined thickness; forming an insulating layer over the plating mold pattern and the coil layer; and repeating one or more times the formation of the seed layer, formation of the plating mold pattern, formation of the coil layer and formation of the insulating layer in sequence, to form a stacked multiple coil layer with flatness between every coil layer of the stack.

BRIEF DESCRIPTION OF THE DRAWINGS

The above and other objects and advantages of the present invention will become more apparent by describing in detail preferred embodiments thereof with reference to the attached drawings in which.

DESCRIPTION OF THE PREFERRED EMBODIMENTS

Figure 1:
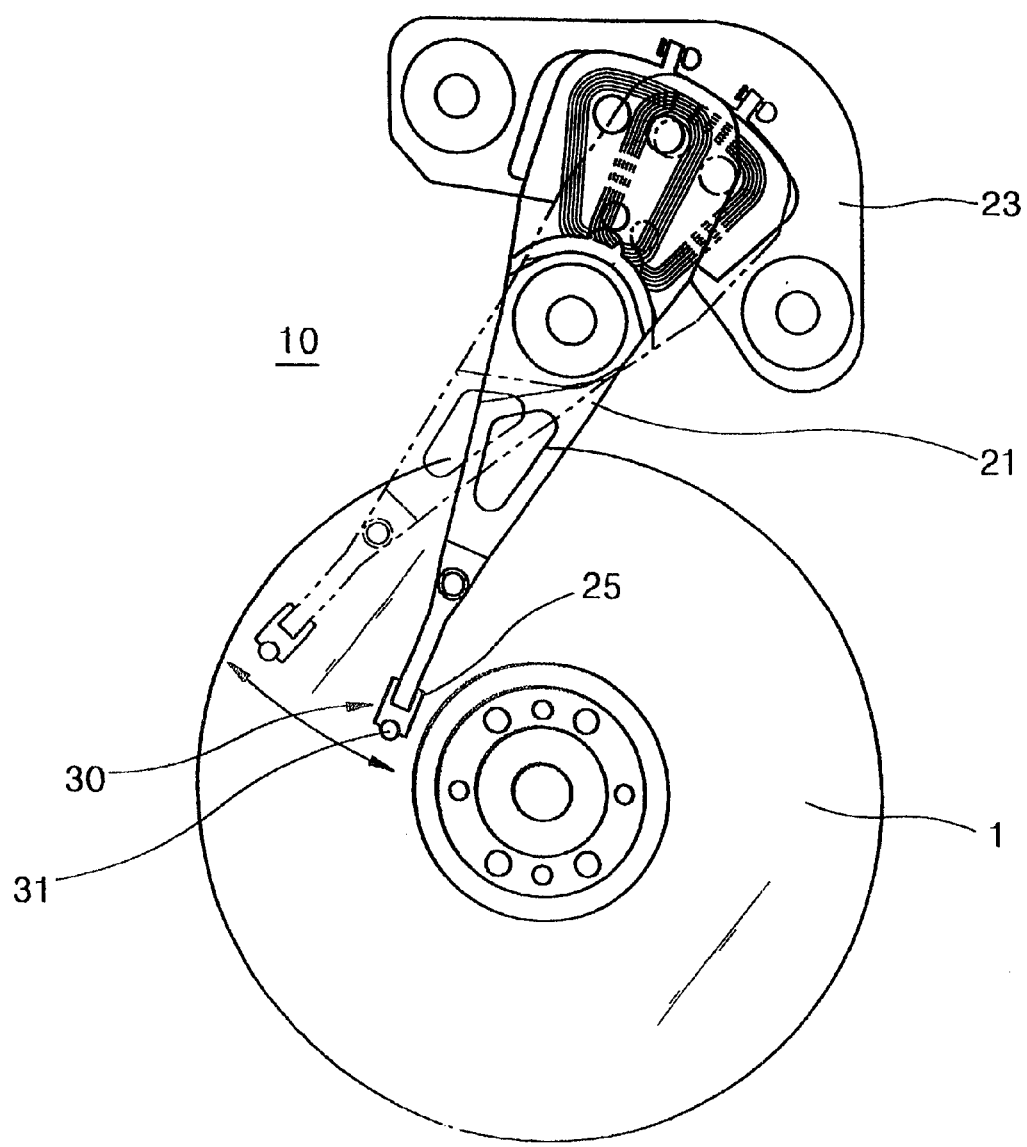
FIG. 1 is a schematic plan view of a conventional magneto-optical reading and writing system.
Figure 2:
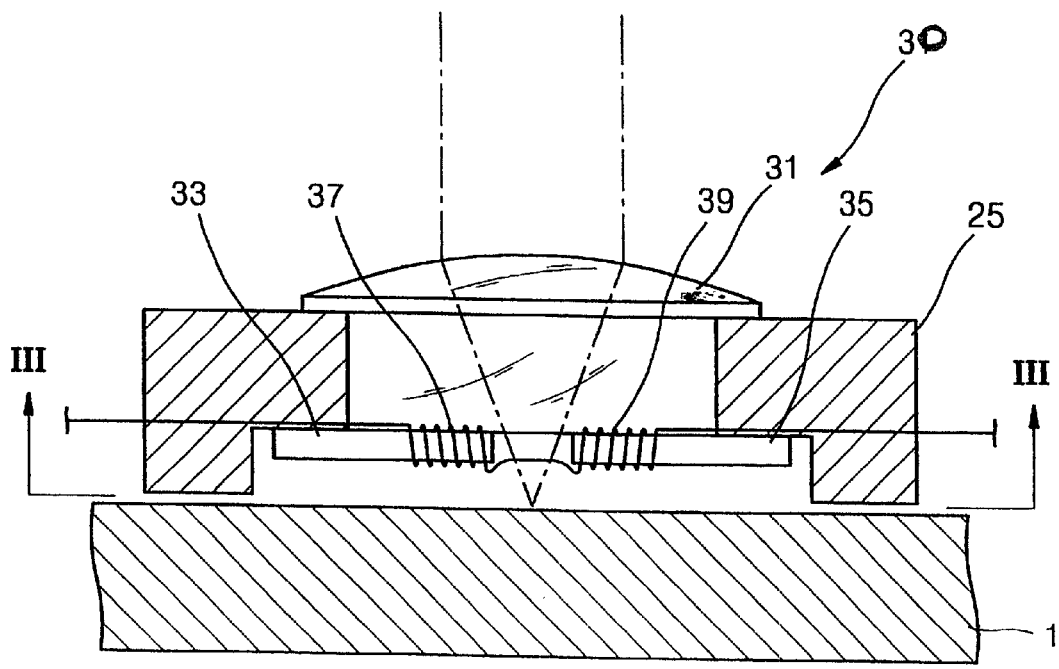
FIG. 2 is a front view of a conventional magneto-optical head of a magneto-optical reading and writing system.
Figure 3:
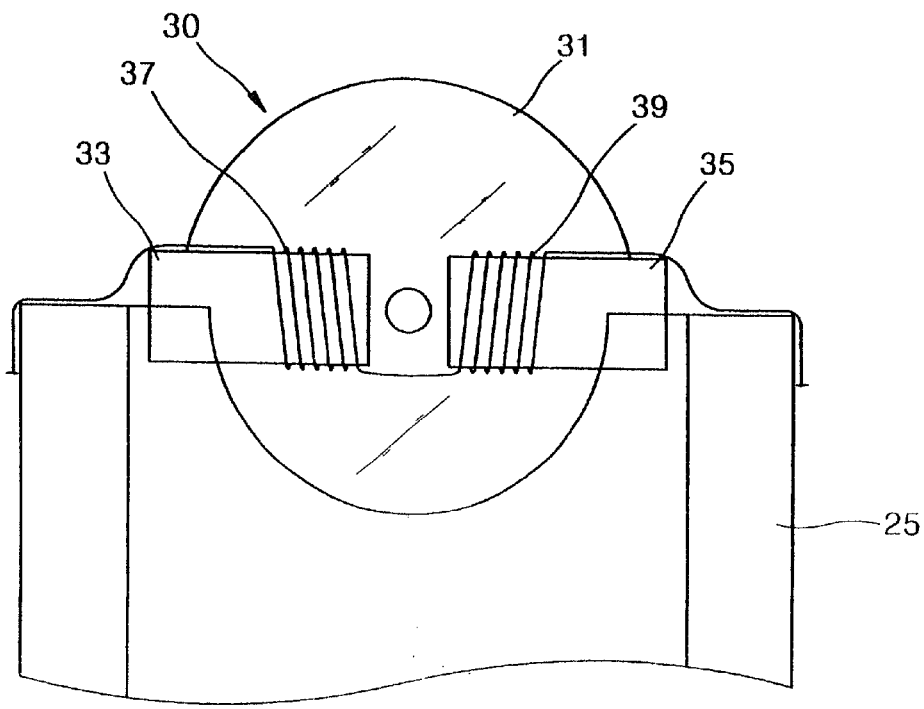
FIG. 3 is a bottom view taken along line III—III of FIG. 2.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 4:
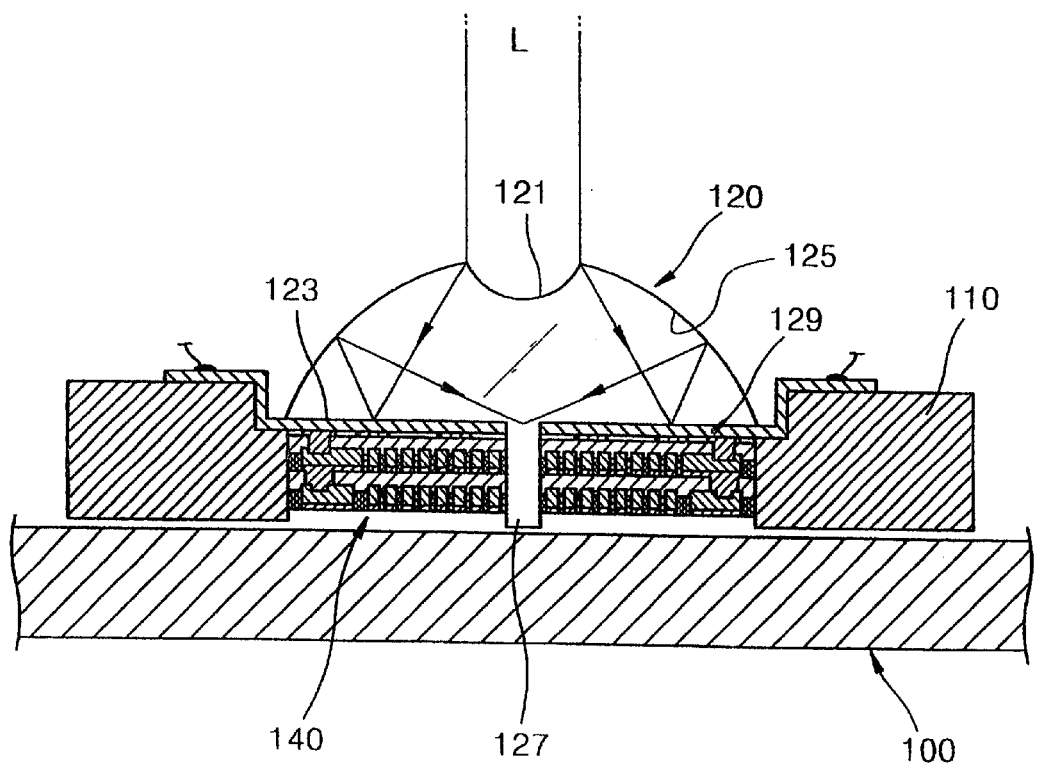
FIG. 4 is a schematic front view showing a magneto-optical head of a magneto-optical reading and writing system according to an embodiment of the present invention mounted on a slider.
Figure 5:
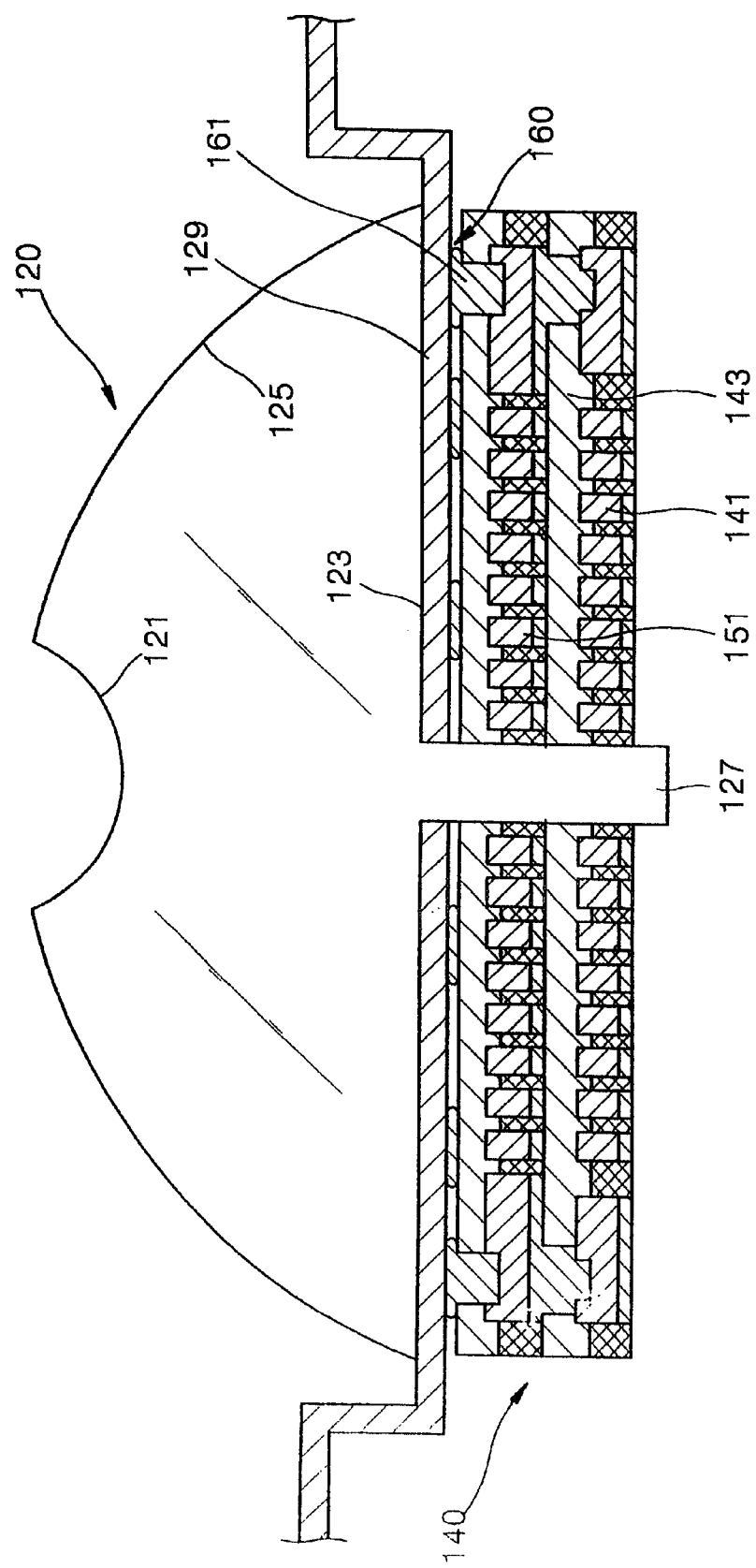
FIG. 5 is a partial front view of the magneto-optical head shown in FIG. 4.

Referring to FIGS. 4 and 5, a magneto-optical head of a magneto-optical reading and writing system according to an embodiment of the present invention is mounted on an air-bearing slider 110, which is movable above the surface of a magneto-optical recording medium 100 by hydrodynamics. The magneto-optical head includes a lens 120 for focusing incident light to form a light spot on the magneto-optical recording medium 100, a coil member 140 attached to one surface of the lens 120, facing the magneto-optical recording medium 100, and a connection member 160 for allowing attachment between the coil member 140 and the lens 120 and electrical connection of the coil member 140 to an external power source.

For a near-field writing operation, the lens 120 focuses incident light to form a light spot on the magneto-optical reading medium 100. As the light spot domain of the magneto-optical recording medium 100 is heated to the Curie point temperature or more of the medium, vertical magnetic fields are produced by the coil member 140 and information is recorded by the magnetization. Recorded information is reproduced by exploiting Kerr's effect. In other words, as the temperature at the light spot is lowered to the Curie point temperature or less, the polarization of the incident beam changes according to the direction of magnetization at the magnetic domain on the medium, so that information can be read from the medium.

Figure 6:
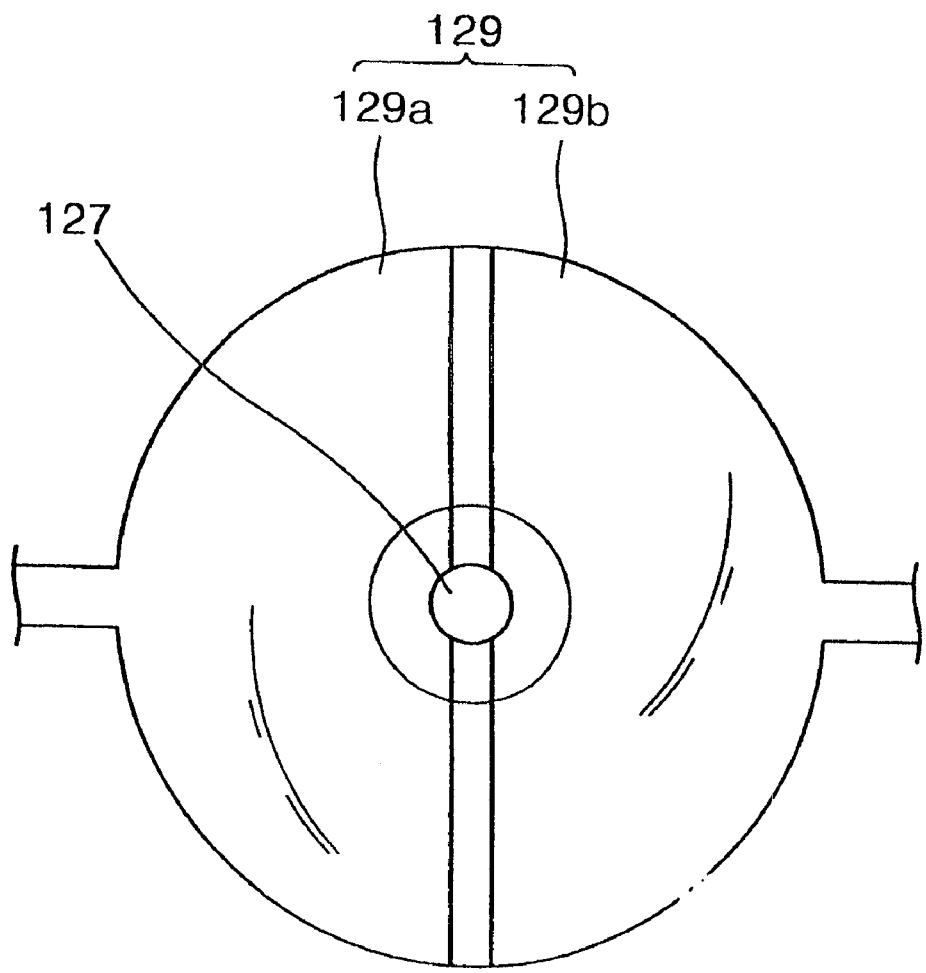
FIG. 6 is a schematic bottom view of the lens in FIG. 5.

For these functions, the lens 120 includes a transmitting portion 121, a first reflective portion 123, a second reflective portion 125, an emitting portion 127 and a conductive reflective layer 129. The transmitting portion 121 is formed in a concave shape to divergently transmit incident light L. The first reflective portion 123, a plane arranged facing the transmitting portion 121, reflects the incident light L toward the second reflective portion 125 adjacent to the transmitting portion 121. The second reflective portion 125 is formed with a concave mirror structure around the transmitting portion 121 such that it focally reflects the incident light reflected by the first reflective portion 123. The emitting portion 127 is formed extending outward a predetermined length from the center of the first reflective portion 123, and transmits the focused light from the second reflective portion 125 to form a light spot on the magneto-optical recording medium 100. For writing and reading operations, the emitting portion 127 is spaced a predetermined distance above the magneto-optical recording medium 100. As shown in FIG. 6, the conductive reflective layer 129, which is divided into at least two portions 129a and 129b, is formed on the first reflective portion 123. Referring to FIG. 5, the conductive reflective layer 129 is made to adhere to the connection member 160 by melting and allows current to flow from an external power supply to the coil member 140. In addition, the conductive reflective layer 129 assures total reflection of the incident light from the first reflective portion 123 toward the second reflective portion 125.

The coil member 140 includes at least two coil layers 141 and 151, and an insulating layer 143 for electrically insulating the coil layers 141 and 151, while being interposed between the same. The coil layers 141 and 151, which are planar coils having a spiral structure, are connected to each other through electric contact points thereof.

Figure 7:
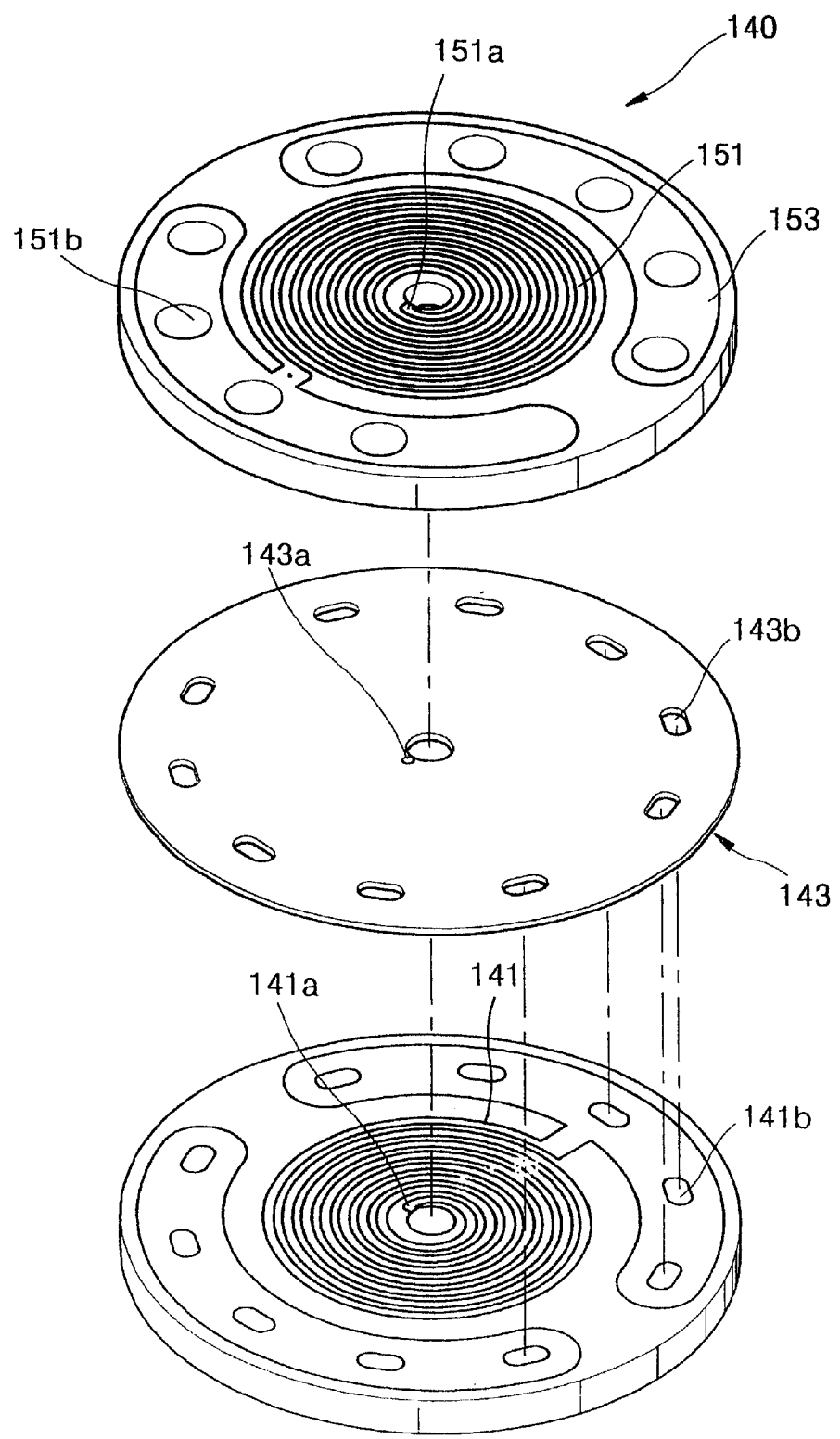
FIG. 7 is an exploded perspective view of the coil member of the magneto-optical head shown in FIG. 4.

In FIGS. 4 and 5, a bilayered coil structure is shown. The detailed construction of the first and second coil layers 141 and 151, and the insulating layer 143 of the coil member 140 will be described with reference to FIG. 7. Referring to FIG. 7, the first coil layer 141 has a spiral structure around the emitting portion 127 of the lens 120 (not shown) in a direction, for example, counterclockwise, within a predetermined distance. The first coil layer 141 includes a first contact point 141a on the inside end of the spiral structure, and second contact points 141b arranged around the circumference of the first coil layer 141. The first and second contact points 141a and 141b are electrically connected to the second coil layer 151 through the insulating layer 143, and in turn to the conductive reflective layer 129 (not shown). The second coil layer 151 is stacked on the first coil layer 141 with the insulating layer 143 interposed therebetween, and has a spiral structure arranged in the reverse direction of the first coil layer 141. The second coil layer 151 has a third contact point 151a, which is connected to the first contact point 141a, and fourth contact points 151b, which are connected through the connection member 160 to the conductive reflective layer 129 (not shown). Further, the second coil layer 151 has a connection pattern 153 around the circumference of the same, which is electrically insulated from the second coil layer 151, and is connected to the first coil layer 141 to allow current flow from the conductive reflective layer 129 (not shown) to the first coil layer 141. Thus, the portion 129b of the conductive reflective layer 129 (not shown) is connected through the connection pattern 153 to the second contact points 141b, while the other portion 129a (not shown) thereof is connected to the fourth contact points 151b. As a result, when current is applied through the portion 129b of the conductive reflective layer 129, the current first flows through first coil layer 141, and then to the second coil layer 151 through the first contact point 141a and then the third contact point 151a. After the current flows through the second coil layer 151, it then flows through the fourth contact points 151b to the other portion 129a (not shown).

The insulating layer 143 is provided for electrical insulation of the first and second coil layers 141 and 151 from each other, and for electrical connection between the first and second coil layers 141 and 151. The insulating layer 143 has through holes 143a and 143b for electrical connections between the first and third contact points 141a and 151a, and between the second contact points 141b and the connection pattern 153.

Referring to FIGS. 4 and 5, it is preferable that the length of the emitting portion 127 of the lens 120 is greater than the total height of the coil member 140 and the connection member 160 so as to prevent the coil member 140 from contacting the magneto-optical recording medium 100 as the slider 110 flies over the magneto-optical recording medium 100.

Preferably, as shown in FIG. 5, the connection member 160, which is formed projecting from the uppermost layer of the coil member 140, for example, from the second coil layer 151, is constructed of solder bumps 161 formed of a conductive material, which allows for physical connection between the conductive reflective layer 129 and the coil member 140 by thermal melting, and for electrical connection between the conductive reflective layer 129, and the first and second coil layers 141 and 151. A tin-lead (Sn-Pd) alloy, a silver-tin-lead (Ag—Sn—Pb) alloy or a gold—tin (Au—Sn) alloy is preferred as a material for the solder bumps 161.

The solder bumps 161 are arranged such that the first and second coil layers 141 and 151 are separately connected to each of the two divided portions 129a and 129b (not shown) of the conductive reflective layer 129. For the solder bumps 161, a pattern is formed over the second coil layer 151 and then subjected to a plating process to arrange the solder bumps 161 as shown in FIG. 5, which allows for a predetermined contact area with the conductive reflective layer 129, and electrode separation between the two divided portions 129a and 129b (not shown). However, a native oxide film exists on the solder bumps 161 formed through these processes, which weakens adhesion to the lens 120 by melting.

Considering this negative factor, the connection between the solder bumps 161 and the lens 120 by thermal melting is carried out by fluxless reflow soldering in which heating is performed in the absence of flux in a high purity nitrogen atmosphere or a vacuum. In other words, the heating in a high purity nitrogen atmosphere or a vacuum prevents the formation of the oxide film on the solder bumps 161 at high temperatures, thereby strengthening adhesion to the lens 120.

FIGS. 8A through 8E are sectional views illustrating a method of manufacturing a magneto-optical head employing a bilayered coil member according to an embodiment of the present invention.

Figure 8A:
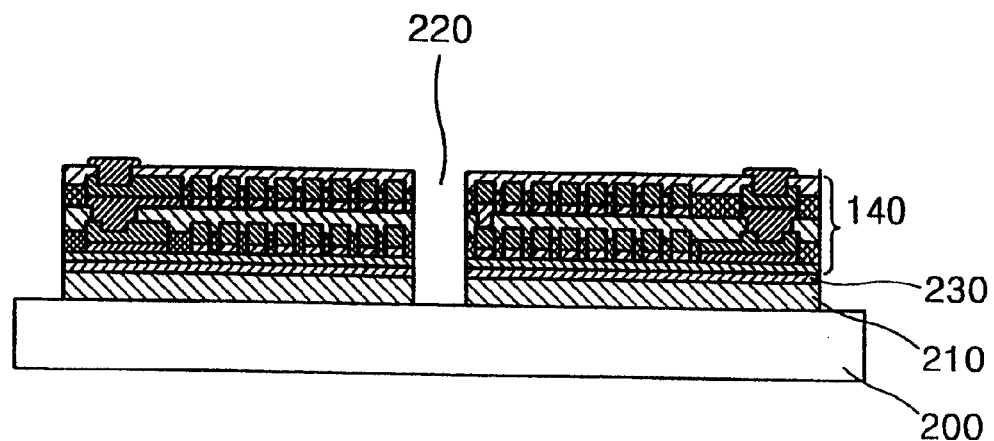
FIGS. 8A through 8E are sectional views illustrating a method of manufacturing a magneto-optical head for a magneto-optical reading and writing system according to an embodiment of the present invention.

In the manufacture of the magneto-optical head, as shown in FIG. 8A, a substrate 200, for example, a silicon wafer, is prepared, and a sacrificial layer 210 is formed over the substrate 200. After a coil member 140 including a plurality of coil layers, for example, two coil layers, and an insulating layer therebetween is formed over the sacrificial layer 210, a through hole 220 to be the emitting portion 127 of the lens 120 shown in FIG. 4 is formed. Here, the through hole 220 is formed through both the coil member 140 and the sacrificial layer 210 such that the length of the emitting portion 127 is greater than the height of the coil member 140.

The sacrificial layer 210 is formed of titanium (Ti), chromium (Cr) or photoresist. If photoresist is selected as a material for the sacrificial layer 210, there is an advantage in that a subsequent removal of the sacrificial layer 210 is easy. If the sacrificial layer 210 is formed of Ti or Cr, a seed layer 230a, which will be described later, can be easily formed.

Figure 8B:
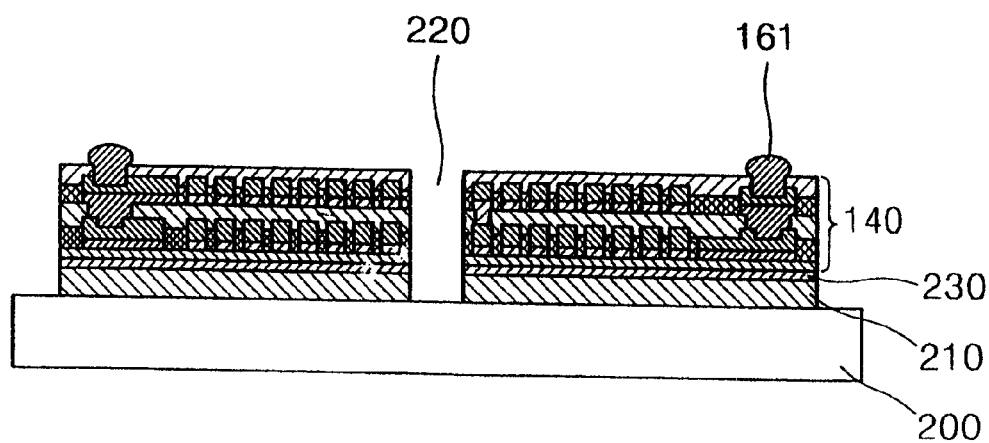

Following this, as shown in FIG. 8B, a plating mold pattern is formed over the uppermost layer, for example, the second coil layer 151 (see FIG. 7) of the coil member 140, and solder is plated into the pattern to form the solder bumps 161. Preferably, the solder bumps 161 are formed of a Sn—Pb alloy, an Ag—Sn—Pb alloy or an Au—Sn alloy.

Figure 8C:
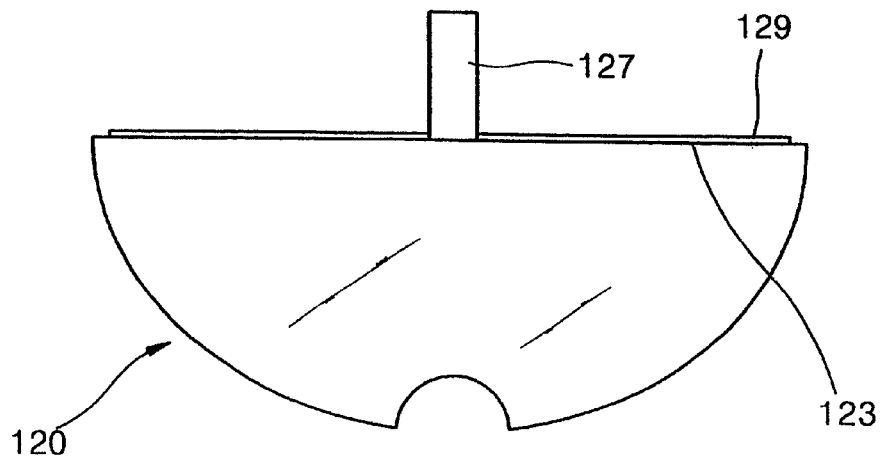

Then, referring to FIG. 8C, the lens 120, which has the emitting portion 127 protruding a predetermined length toward the magneto-optical recording medium 100 (see FIG. 4) for focusing incident light to form a light spot on the magneto-optical recording medium 100, is prepared. Then, a metal thin film is coated on the outside of the first reflective portion 123 of the lens 120, facing the coil member 140, surrounding the region of the emitting portion 127, which results in the conductive reflective layer 129.

Figure 8D:
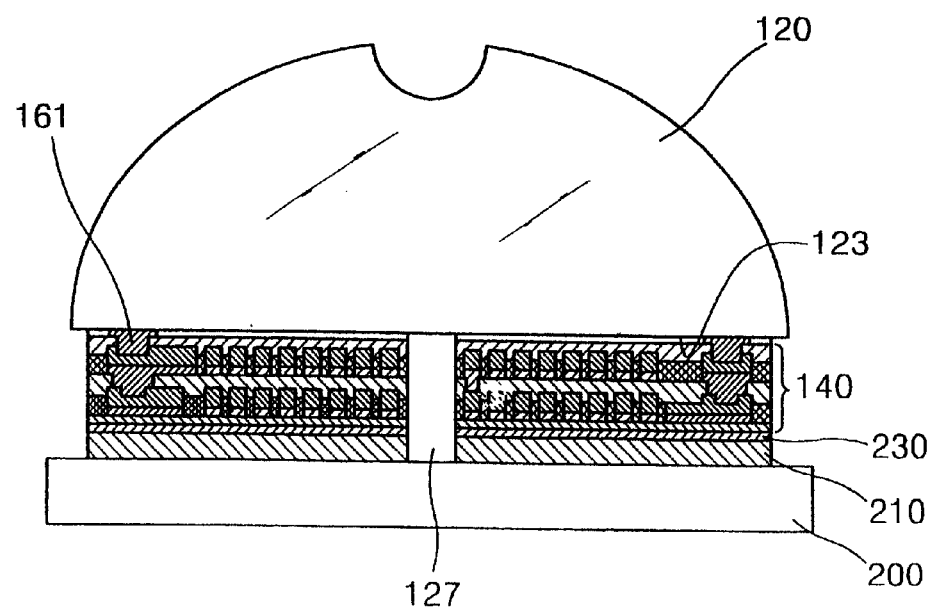

Then, the emitting portion 127 of the lens 120 is inserted into the through hole 220 to seat the lens 120 over the solder bumps 161 as shown in FIG. 8D, and then the assembly is subjected to heating, which allows connection between the lens 120 and the coil member 140 by melting. Here, the heating to melt the solder bumps 161 for adhesion to the lens 120 is performed by fluxless reflow soldering in a pure nitrogen atmosphere or a vacuum. The heating in a high purity nitrogen atmosphere or a vacuum prevents the formation of an oxide film on the solder bumps 161 at high temperatures, thereby improving adhesion strength with respect to the lens 120.

Figure 8E:
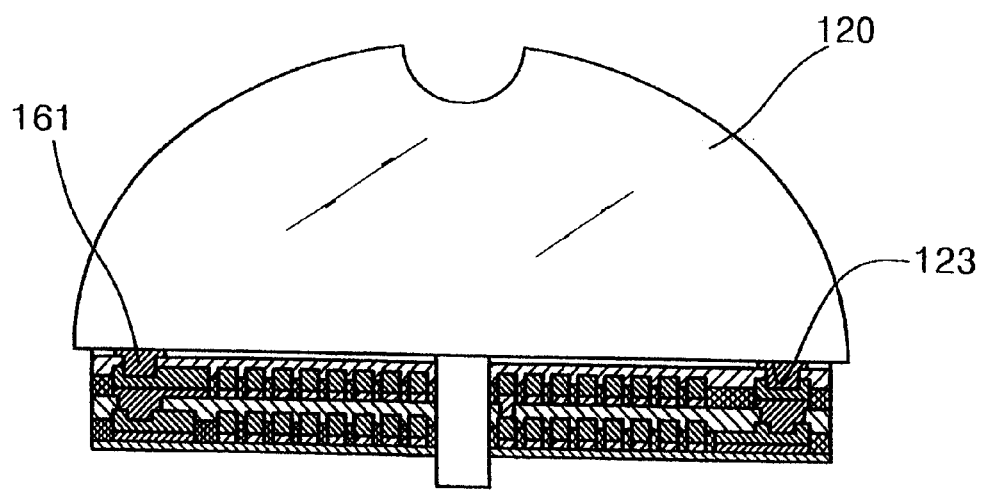

As the last process, the sacrificial layer 210 shown in FIG. 8D is removed to separate the assembly of the lens 120 and the coil member 140 from the substrate 200, which results in the magneto-optical head having the construction as shown in FIG. 8E.

The formation of the coil member 140, which was described with reference to FIG. 8A, will be described in greater detail with reference to FIGS. 9A through 9K.

Figure 9A:
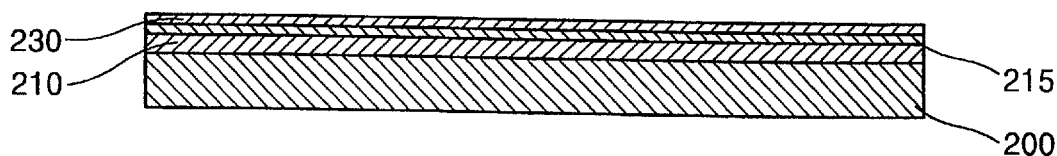
FIGS. 9A through 9K are sectional views illustrating in greater detail the fabrication method of the coil member for the magneto-optical reading and writing system according to the present invention.

Referring to FIG. 9A, a first seed layer 230 is formed over a sacrificial layer 210 on a substrate 200. The first seed layer 230 acts as an electrode for plating the first coil layer 141 (see FIG. 9D), and is formed by vacuum depositing a material having a superior conductivity, for example, copper (Cu), over the sacrificial layer 210. If the sacrificial layer 210 is formed of a photoresist, it is preferable that prior to the deposition of the first seed layer 230, an adhesive layer 215 of Cr or Ti is deposited over the sacrificial layer 210 in order to enhance adhesion strength with respect to the first seed layer 230. A Cr—Cu alloy or Ti—Cu alloy is preferred as a material for the first seed layer 230a.

Figure 9B:
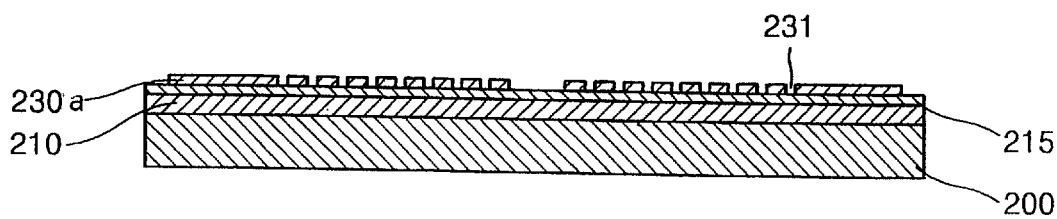

Following this, as shown in FIG. 9B, the first seed layer 230a is patterned according to the desired shape of the first coil layer 141. In other words, the first seed layer 230a is patterned to form first insulating grooves 231, which will form a first plating pattern 240 shown in FIG. 9C later.

Figure 9C:
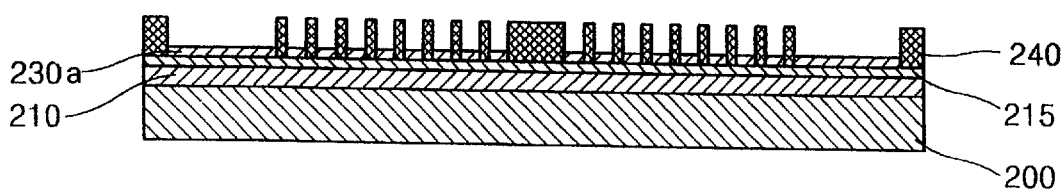

Referring to FIG. 9C, a plating mold is deposited over the first seed pattern 230a to a predetermined thickness and patterned to be negative with respect to the shape of the first coil layer 141 shown in FIG. 7, so that the first plating pattern 240 is completed. Here, because the first seed pattern 230a is as thin as about 1000 Å, a spin coating technique is preferred for the deposition of a plating mold to ensure that the surface of the mold layer is flat. The first plating pattern 240 is formed of an insulating material such as photoresist. For this case, the patterning of the first plating pattern 240 can be completed by only one photolithography process.

Figure 9D:
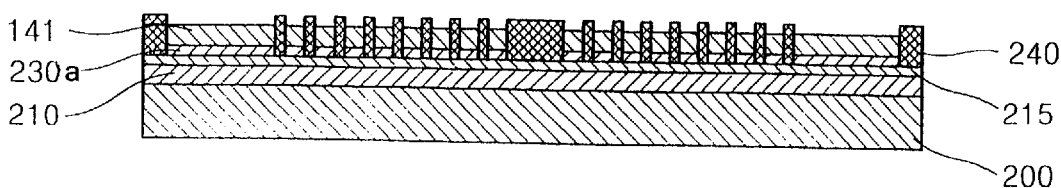

Referring to FIG. 9D, a metal is plated into the first plating pattern 240 to a predetermined thickness, which results in the first coil layer 141 having a spiral structure with a predetermined line width. Here, the first coil layer 141 is a relatively thick metal layer, which is more durable in a large current flow environment, and thus a plating technique is preferred for the formation of such a thick metal layer. Here, both electroplating techniques and electroless plating techniques are applicable.

Figure 9E:
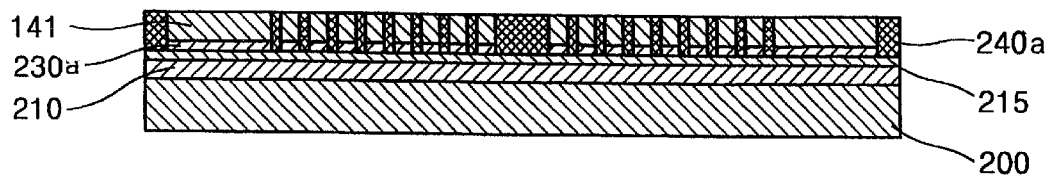

Following this, the first plating pattern 240 is subjected to heating. This heating process removes all of the remaining solvent from the first plating pattern 240, and minimizes potential deformation of the first plating pattern 240 by the solvent. As a result of the heating it process, the height of the first plating pattern 240a is lowered as shown in FIG. 9E. Taking this into account, it is preferable that the first plating pattern 240 is formed to be higher than the height of the first coil layer 141 as shown in FIG. 9D. For example, assuming that after the heating process the height of the first plating pattern 240 is reduced by 70% of the original height of the same before, the first plating pattern 240 can be formed to be about 140% higher than the height of the first coil layer 141, such that the top surface of the first plating pattern 240a becomes nearly level with the first coil layer 141 after the heating process, as shown in FIG. 9E.

The heating process can be performed by an oven, a flat heating device, an ultra-violet curing device, or an electron-beam heating device.

Figure 9F:
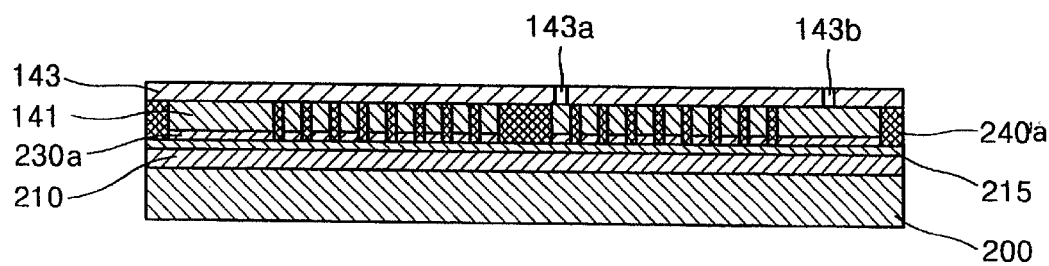

Following this, as shown in FIG. 9F, the insulating layer 143 is formed over the first plating pattern 240a and the first coil layer 141 for electrical insulation between the first coil layer 141 and the second coil layer 151 (see FIG. 9J) to be formed later. The insulating layer 143 has apertures 143a and 143b, which allow the first coil layer 141 to be electrically connected with the second coil layer 151 and the conductive reflective layer 129 (not shown) through the first and second contact points 141a and 141b (see FIG. 7) thereof. Preferably, the insulating layer 143 is formed of a dielectric material, such as $SiO_2$ and $Si_3N_4$, or a polymer such as photoresist and polyimide.

Figure 9G:
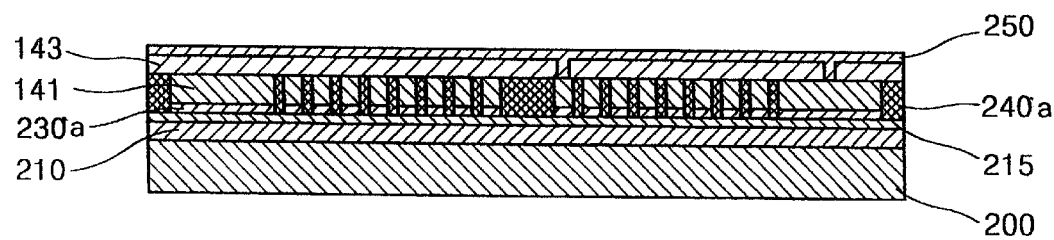

Then, as shown in FIG. 9G, a second seed layer 250 is formed over the insulating layer 143. The second seed layer 250 acts as an electrode for plating the second coil layer 151 shown in FIG. 9J, and is formed by vacuum depositing a material having a superior conductivity, for example, copper (Cu), over the insulating layer 143. Here, the apertures 143a and 143b shown in FIG. 7 are filled with the conductive material, which allows the first and second coil layers 141 and 151 to be electrically connected through the contact points thereof.

Figure 9H:
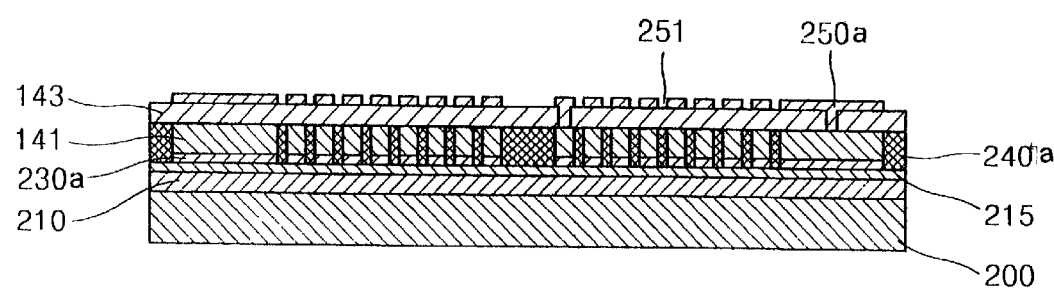
Figure 9I:
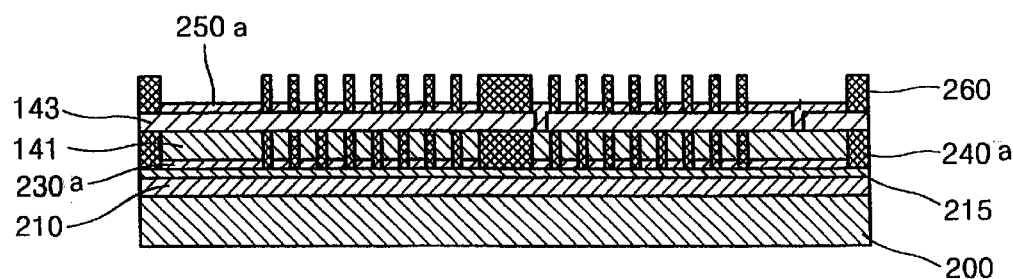
Figure 9J:
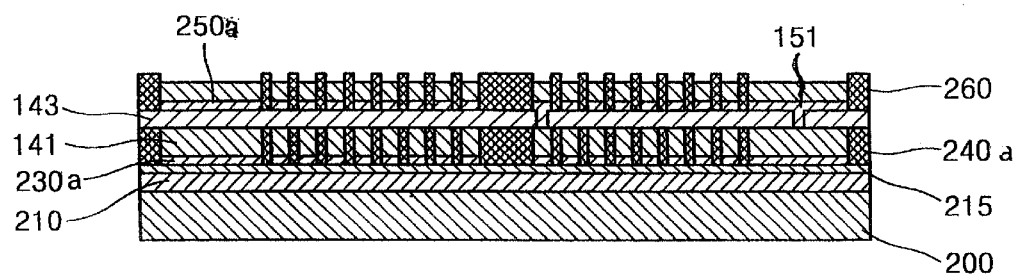

Then, as shown in FIG. 9H, the second seed layer 250 is patterned according to the desired shape of the second coil layer 151 shown in FIG. 9J. In other words, the second seed layer 250 is patterned to form second insulating grooves 251, which will form a second plating pattern 260 (see FIG. 9I) later. The second seed layer 250 is formed of a Cr—Cu alloy or Ti—Cu alloy, which also can be used to form the first seed layer 230 as described previously.

Following this, referring to FIG. 9I, a plating mold is deposited over the second seed pattern 250a to a predetermined thickness and patterned to be negative with respect to the shape of the second coil layer 151, so that the second plating pattern 260 is completed.

Referring to FIG. 9J, a metal is plated into the second plating pattern 260 to a predetermined thickness, which results in the second coil layer 151 having a spiral structure with a predetermined line width. Here, the second coil layer 151 is a relatively thick metal layer, which is more durable in a large current flow environment, and thus a plating technique is preferred for the formation of such a thick metal layer. Here, both electroplating techniques and electroless plating techniques are applicable.

Figure 9K:
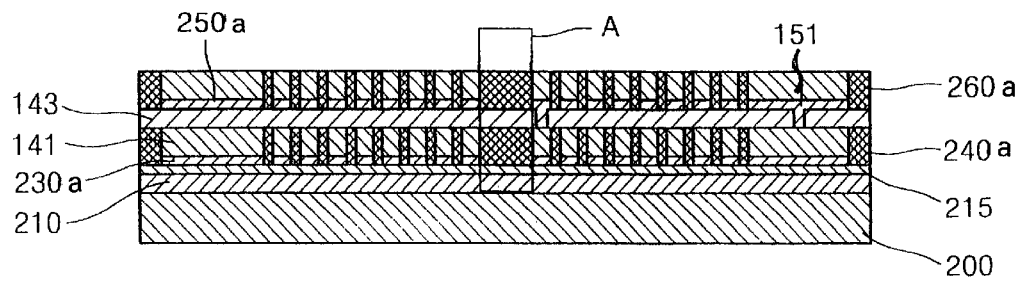

Following this, the second plating pattern 260 is subjected to heating. This heating process removes all of the remaining solvent from the second plating pattern 260, and minimizes potential deformation of the second plating pattern 260 by the solvent. As a result it of the heating process, the height of the second plating pattern 260 is lowered as shown in FIG. 9K. Taking this into account, it is preferable that the second plating pattern 260 is formed to be higher than the height of the second coil layer 151 as shown in FIG. 9J in order that the top surface of the second plating pattern 260a becomes nearly level with the second coil layer 151 after the heating process, as shown in FIG. 9K. Then, the portion A is removed to form a through hole that is to be the emitting portion 127 of the lens 120 (see FIG. 8D), so that the formation of the coil member 140 is completed.

As described above, in the magneto-optical head of a magneto-optical reading and writing system according to the present invention having the construction described previously, a thin film type microcoil is combined with a lens by solder bumps, and thus the assembly process is easy to perform and adhesion strength therebetween is strong. In addition, there is no need for additional interconnection, thereby reducing the number of processes in the manufacture of magneto-optical heads.

Also, the adoption of a thin film type microcoil enables miniature heads to be manufactured through common semiconductor manufacturing processes, such as thin film formation and plating, thereby reducing the manufacturing while increasing yield.

In addition, the technique used to form the coil member for a magneto-optical head maintains the flatness over the top of every coil layer. Thus, after a lower coil layer is completed and a seed layer for an upper coil layer is plated, the focal depth of an exposure light system for patterning the seed layer can be maintained, avoiding reduction in resolution of the pattern. In addition, a problem of disconnection of the metal seed layer for the upper coil layer can be prevented. Thus, the distance between different coil layers can be maintained over line and space regions thereof within a desired range, so that multiple thin film layers can be easily stacked into a microcoil structure.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. A magneto-optical head for a magneto-optical writing and/or reading system capable of writing information on a magneto-optical recording medium by field modulation and optically reading information from the magneto-optical recording medium, the magneto-optical head being mounted at the end of a slide-arm movable over the magneto-optical recording medium by hydrodynamics, the magneto-optical head comprising:

a lens mounted at the end of the slide-arm, which focuses incident light to form a light spot on the magneto-optical recording medium;

a coil member comprising stacked coil layers, and an insulating layer interposed between adjacent ones of the coil layers that electrically insulates the coil layers from one another, each of the coil layers being planar coils with a spiral structure and comprising electrical contacts for electrical connection therebetween; and a connection member interposed between said lens and said coil member, which connects said coil member to one side of said lens, facing the magneto-optical recording medium, and which electrically connects the coil layers to an external power supply.

2. The magneto-optical head of claim 1, wherein said connection member comprises solder bumps formed projecting from an uppermost one of the coil layers of said coil member, wherein the solder bumps are formed of a conductive material for electrical connection to the external power supply and adhere to said lens by thermal melting.

3. The magneto-optical head of claim 2, wherein the solder bumps are formed of at least one metal alloy selected from the group consisting essentially of a tin-lead (Sn—Pb) alloy, a silver-tin-lead (Ag—Sn—Pb) alloy and a gold-tin (Au—Sn) alloy.

4. The magneto-optical head of claim 1, wherein each of the coil layers of said coil member has a similar spiral structure, with each spiral structure having an opposite direction from that of an adjacent one of the coil layers.

5. The magneto-optical head of claim 1, wherein said lens comprises:

a transmitting portion which divergently transmits incident light, a first reflective portion positioned facing the transmitting portion, which reflects the transmitted light as first reflected light, a second reflective portion formed around the transmitting portion, which reflects the first reflected light as second reflected light which is focused, an emitting portion formed extending outward a predetermined length from the center of the first reflecting portion, which transmits the second reflected light, and a conductive reflective layer formed on the outer side of the first reflective layer, for electrical connection to the external power supply, the conductive reflective layer being divided into at least two portions and connected to said connection member by melting.

6. The magneto-optical head of claim 5, wherein the emitting portion is formed to be longer than the thickness of said coil member so as to prevent said coil member from contacting the magneto-optical recording medium as the slide-arm moves over the magneto-optical recording medium.

7. A magneto-optical head for a magneto-optical writing and/or reading system for writing onto or reading from a magneto-optical recording medium, the magneto-optical head comprising:

a coil member comprising a plurality of planar coil layers, adjacent ones of the coil layers being electrically connected through a respective insulating layer disposed therebetween; and a lens connected to said coil member;

wherein:

said lens focuses incident light onto the magneto-optical recording medium, each planar coil layer further comprises a spiral structure, and the direction of the spiral structure of each planar coil layer is opposite to that of an adjacent one of the coil layers.

8. The magneto-optical head of claim 7, wherein one of the coil layers further comprises:

a first external connector electrically connected to the spiral structure of the respective coil layer;

a second external connector electrically connected through the insulating layer to the adjacent one of the coil layers; and a central connector electrically connected to the spiral structure of the respective coil layer and through the insulating layer to the adjacent one of the coil layers.

9. The magneto-optical head of claim 8, further comprising a connection member which connects said lens to said coil member and electrically connects said coil member to a power supply.

10. A magneto-optical head for a magneto-optical writing and/or reading system for writing onto or reading from a magneto-optical recording medium, the magneto-optical head comprising:

a coil member comprising a plurality of planar coil layers, adjacent ones of the coil layers being electrically connected through a respective insulating layer disposed therebetween; and a lens connected to said coil member;

wherein:

said lens focuses incident light onto the magneto-optical recording medium, and said lens further comprises:

a transmitting portion which receives and transmits the incident light; and an internal reflection portion within said lens;

wherein the internal reflection portion receives the transmitted light and internally reflects the transmitted light to focus incident light onto the magneto-optical recording medium.

11. The magneto-optical head of claim 10, wherein said lens further comprises an emitting portion which receives the internally reflected light and emits the light onto the magneto-optical recording medium.

12. The magneto-optical head of claim 11, wherein the emitting portion extends through the coil member.

13. A magneto-optical head for a magneto-optical writing and/or reading system for writing onto or reading from a magneto-optical recording medium, the magneto-optical head comprising:

a coil member comprising a plurality of planar coil layers, adjacent ones of the coil layers being electrically connected through a respective insulating layer disposed therebetween; and a lens connected to said coil member;

wherein said lens focuses incident light onto the magneto-optical recording medium, and further comprising a connection member interposed between said lens and said coil member, which connects said coil member to one side of said lens, facing the magneto-optical recording medium, and which electrically connects the coil layers to an external power supply.

14. A magneto-optical head for a magneto-optical writing and/or reading system for writing onto or reading from a magneto-optical recording medium, the magneto-optical head comprising:

a coil member comprising a plurality of planar coil layers, adjacent ones of the coil layers being electrically connected through a respective insulating layer disposed therebetween; and a lens connected to said coil member;

wherein:

said lens focuses incident light onto the magneto-optical recording medium, and said connection member comprises solder bumps formed projecting from an uppermost one of the coil layers of said coil member, wherein the solder bumps are of a conductive material for electrical connection to the external power supply, and adhere to said lens by thermal melting.

15. The magneto-optical head of claim 14, wherein the thermal melting is carried out by fluxless reflow soldering.

16. The magneto-optical head of claim 14, wherein the solder bumps are formed of at least one metal alloy selected from the group consisting essentially of a tin-lead (Sn-Pb) alloy, a silver-tin-lead (Ag—Sn—Pb) alloy and a gold-tin (Au—Sn) alloy.

17. A magneto-optical head for a magneto-optical writing and/or reading system for writing onto or reading from a magneto-optical recording medium, the magneto-optical head comprising:

a coil member comprising a plurality of planar coil layers, adjacent ones of the coil layers being electrically connected through a respective insulating layer disposed therebetween; and a lens connected to said coil member;

wherein:

said lens focuses incident light onto the magneto-optical recording medium, and the lens further comprises a conductive layer;

each of the coil layers comprises first and second contact portions which electrically connect to another one of the coil layers through the respective insulating layer, and one of the coil layers includes a third contact portion which electrically connects the coil member to the conductive layer of the lens to form the electrical pathway between the conductive layer and the coil layers.

18. The magneto-optical head of claim 17, wherein:

the first contact portions are disposed at inner portions of the coil layers, and the second contact portions are disposed at outer portions of the coil layers, and each of the coil layers comprises a spiral coil which spirals outward from a corresponding one of the first contact portions to a corresponding one of the second contact portions.

19. The magneto-optical head of claim 18, wherein:

the one coil layer includes a connected second contact portion connected to the spiral coil of the one coil layer, and a non-connected second contact portion not connected to the corresponding spiral coil of the one coil layer, the conductive layer of the lens comprises first and second conductive portions, the first conductive portion connects via the third contact portion and the non-connected second contact portion of the one coil layer to the second contact portion of an adjacent one of the coil layers so as to be connected to the spiral coil of the adjacent coil layer, and the second conductive portion connects to the connected second contact portion of the one coil layer so as to form the electrical pathway between the conductive surface and the first and second conductive portions of the conductive layer via the spiral coils of the coil layers.

20. A magneto-optical head for a magneto-optical writing and/or reading system for writing onto or reading from a magneto-optical recording medium, the magneto-optical head comprising:

a slider member moveable relative to the magneto-optical recording medium and including a hole;

a lens having a conductive layer and which focuses incident light onto the magneto-optical recording medium, the lens being disposed in the hole; and a coil member comprising planar coil layers separated by an insulating layer through which the coil layers are electrically connected to each other and to the conductive layer of the lens.

21. The magneto-optical head of claim 20, wherein the slider comprises a conductive surface electrically connected to the conductive layer of the lens such that an electrical pathway exists between the coil layers, the conductive layer, and the conductive surface.

22. The magneto-optical head of claim 21, wherein the coil member is disposed in the hole between the lens and the magneto-optical recording medium.

23. The magneto-optical head of claim 21, wherein:

each of the coil layers comprises first and second contact portions which electrically connect to an adjacent one of the coil layers through the insulating layer, and one of the coil layers includes a third contact portion which connects the coil member to the conductive layer of the lens to form the electrical pathway between the conductive surface and the coil layers.

24. The magneto-optical head of claim 23, wherein:

the first contact portions are disposed at inner portions of the coil layers, and the second contact portions are disposed at outer portions of the coil layers, and each of the coil layers comprises a spiral coil which spirals outward from a corresponding one of the first contact portions to a corresponding one of the second contact portions.

25. The magneto-optical head of claim 24, wherein:

the one coil layer includes a connected second contact portion connected to the spiral coil of the one coil layer, and a non-connected second contact portion not connected to the corresponding spiral coil of the one coil layer, the conductive layer of the lens comprises first and second conductive portions, the first conductive portion connects via the third contact portion and the non-connected second contact portion of the one coil layer to the second contact portion of the adjacent coil layer so as to be connected to the spiral coil of the adjacent coil layer, and the second conductive portion connects to the connected second contact portion of the one coil layer so as to form the electrical pathway between the conductive surface and the first and second conductive portions of the conductive layer via the spiral coils of the coil layers.

* * * * *

UNITED STATES PATENT AND TRADEMARK OFFICE
CERTIFICATE OF CORRECTION

PATENT NO. : 6,633,513 B1
DATED : October 14, 2003
INVENTOR(S) : Woo-bae Kim et al.

It is certified that error appears in the above-identified patent and that said Letters Patent is hereby corrected as shown below:

Column 11,
Line 57, after "and" add a paragraph return

Signed and Sealed this

Fourth Day of May, 2004

JON W. DUDAS
*Acting Director of the United States Patent and Trademark Office*